US012626856B2

(12) United States Patent
Horino

(10) Patent No.: US 12,626,856 B2
(45) Date of Patent: May 12, 2026

(54) REACTOR, METHOD FOR MANUFACTURING REACTOR, AND REACTOR COIL COVERING

(71) Applicant: TOKAI KOGYO CO., LTD., Obu (JP)

(72) Inventor: Yusuke Horino, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 636 days.

(21) Appl. No.: 18/008,790

(22) PCT Filed: Jun. 25, 2021

(86) PCT No.: PCT/JP2021/024087

§ 371 (c)(1),
(2) Date: Dec. 7, 2022

(87) PCT Pub. No.: WO2022/038896

PCT Pub. Date: Feb. 24, 2022

(65) Prior Publication Data

US 2023/0215621 A1 Jul. 6, 2023

(30) Foreign Application Priority Data

Aug. 21, 2020 (JP) ................................ 2020-140000

(51) Int. Cl.
*H01F 27/32* (2006.01)
*H01F 27/24* (2006.01)
(Continued)

(52) U.S. Cl.
CPC ........... *H01F 27/327* (2013.01); *H01F 27/24* (2013.01); *H01F 37/00* (2013.01); *H01F 41/12* (2013.01)

(58) Field of Classification Search
CPC ...... H01F 27/025; H01F 27/24; H01F 27/306; H01F 27/324; H01F 41/0246; H01F 37/00; H01F 27/02; H01F 27/022
See application file for complete search history.

(56) References Cited

U.S. PATENT DOCUMENTS

2011/0156853 A1 6/2011 Kato et al.
2011/0234359 A1* 9/2011 Ono ...................... H01F 27/327 336/216
(Continued)

FOREIGN PATENT DOCUMENTS

CN 11155490 * 8/2020
JP 2010-074150 A 4/2010
(Continued)

OTHER PUBLICATIONS

Sep. 21, 2021 International Search Report Issued in International Patent Application No. PCT/JP2021/024087.
(Continued)

*Primary Examiner* — Kenneth Whittington
(74) *Attorney, Agent, or Firm* — Oliff PLC

(57) ABSTRACT

There are provided a reactor, a reactor coil covering, and a method for manufacturing a reactor, which are capable of preventing peeling off of an insulation coat with which an outer peripheral surface of a winding is covered. A reactor includes a core, a coil disposed on an outer periphery of the core, and a resin mold portion partially covering and integrating the core and the coil. A winding of the coil has an outer peripheral surface covered with an insulation coat. At least one part of a surface of the coil is covered with a protective membrane to cover a boundary between adjacent turns of the coil.

9 Claims, 7 Drawing Sheets

(51) Int. Cl.
*H01F 37/00* (2006.01)
*H01F 41/12* (2006.01)

(56) References Cited

U.S. PATENT DOCUMENTS

| | | | | |
|---|---|---|---|---|
| 2012/0044033 | A1* | 2/2012 | Kawaguchi | H01F 27/306<br>336/90 |
| 2014/0218156 | A1* | 8/2014 | Shinohara | H01F 27/2852<br>336/192 |
| 2016/0118185 | A1 | 4/2016 | Hirata et al. | |
| 2016/0351325 | A1* | 12/2016 | Xie | H01F 27/324 |
| 2018/0330866 | A1* | 11/2018 | Takada | H01F 27/08 |
| 2020/0013542 | A1* | 1/2020 | Nanbara | H01F 27/325 |

FOREIGN PATENT DOCUMENTS

| | | | | |
|---|---|---|---|---|
| JP | 2014-220457 | A | | 11/2014 |
| JP | 2018-011019 | A | | 1/2018 |
| JP | 2019129288 | | * | 8/2019 |
| JP | 2020-021854 | A | | 2/2020 |

OTHER PUBLICATIONS

Sep. 21, 2021 Written Opinion Issued in International Patent Application No. PCT/JP2021/024087.

Aug. 1, 2023 Office Action issued in Japanese Patent Application No. 2020-140000.

* cited by examiner

REACTOR, METHOD FOR MANUFACTURING REACTOR, AND REACTOR COIL COVERING

TECHNICAL FIELD

The present invention relates to a reactor used as a component of a converter or the like, a method for manufacturing the reactor, and a reactor coil covering.

BACKGROUND ART

In the related art, a hybrid vehicle or an electric vehicle is equipped with a converter for boosting a battery voltage, and the converter includes a part such as a reactor. The reactor is manufactured, for example, by inserting a coil assembly into a mold, and filling the mold with a molten resin material and injection molding the molten resin material, the coil assembly including a core and a coil formed by winding windings around an outer periphery of the core (for example, see Patent Literature 1).

CITATION LIST

Patent Literature

Patent Literature 1: JP2010-074150A (see paragraphs 0049, 0071 to 0077, FIGS. 2 and 4, etc.)

DISCLOSURE OF INVENTION

Technical Problem

However, in the related art described in Patent Literature 1, a foreign substance (for example, sintered metal particles or metal chips of the core) may be caught in a gap between the windings forming the coil. In addition, when the coil with the core inserted therein is disposed in the mold or when the mold is closed, a surface of the coil may come into contact with the mold. Then, in these cases, the windings are likely to be damaged, and an insulation coat (enamel coat) covering the windings may peel off. As a result, a short circuit may occur between the windings, resulting in heat generation.

The present invention is made in view of the above-mentioned problems, and an object thereof is to provide a reactor capable of preventing peeling off of an insulation coat with which an outer peripheral surface of a winding is covered, a method for manufacturing the reactor, and a reactor coil covering.

Solution to Problem

In order to solve the above-mentioned problems, a gist of an invention according to a solution 1 is a reactor including a core; a coil disposed on an outer periphery of the core; and a resin mold portion partially covering and integrating the core and the coil. A winding of the coil has an outer peripheral surface covered with an insulation coat, and at least one part of a surface of the coil is covered with a protective membrane to cover a boundary between adjacent turns of the coil.

Therefore, according to the invention according to the solution 1, since the at least a part of the surface of the coil is covered with the protective membrane so as to cover the boundary between the adjacent turns of the coil, it is possible to prevent a foreign substance (for example, sintered metal particles or metal chips of the core) from being caught in a gap between the adjacent turns. In addition, it is also possible to prevent other members (for example, a forming mold for molding the resin mold portion) from coming into contact with the surface of the coil. As a result, since the coil is less likely to be damaged, it is possible to prevent peeling off of the insulation coat with which the outer peripheral surface of the winding is covered.

A gist of an invention according to a solution 2 is that in the solution 1, the protective membrane is a film.

Therefore, according to the invention according to the solution 2, by covering the surface of the coil with the film, the gap between the adjacent turns of the coil can be closed with the film, and thus it is possible to prevent a foreign substance from entering the gap.

A gist of an invention according to a solution 3 is that in the solution 1 or 2, at least one part of a region which is not covered with the resin mold portion on the surface of the coil is not covered with the protective membrane.

Therefore, according to the invention according to the solution 3, since heat is released from a region on the surface of the coil which is not covered with the resin mold portion, is not covered with the protective membrane, and is exposed to the outside, a predetermined heat dissipation property can be ensured.

A gist of an invention according to a solution 4 is a reactor coil covering including a coil disposed on an outer periphery of a core. A winding of the coil has an outer peripheral surface covered with an insulation coat, and at least one part of a surface of the coil is covered with a protective membrane to cover a boundary between adjacent turns of the coil.

Therefore, according to the invention according to the solution 4, since the at least a part of the surface of the coil is covered with the protective membrane so as to cover the boundary between the adjacent turns of the coil, it is possible to prevent a foreign substance from being caught in a gap between the adjacent turns. In addition, it is also possible to prevent other members from coming into contact with the surface of the coil. As a result, since the coil is less likely to be damaged, it is possible to prevent peeling off of the insulation coat with which the outer peripheral surface of the winding is covered.

A gist of an invention according to a solution 5 is a method for manufacturing a reactor, the reactor including a core, a coil disposed on an outer periphery of the core, and a resin mold portion partially covering and integrating the core and the coil, a winding of the coil having an outer peripheral surface covered with an insulation coat. The method includes: a coil covering preparing operation of providing a coil covering formed by covering at least one part of a surface of the coil with a protective membrane to cover a boundary between adjacent turns of the coil; a coil assembly preparing operation of providing a coil assembly formed by assembling the core and the coil covering; and a resin mold portion molding operation of setting the coil assembly in a forming mold and then performing an injection molding to mold the resin mold portion.

Therefore, according to the invention according to the solution 5, since the coil covering formed by covering the at least a part of the surface of the coil with the protective membrane so as to cover the boundary between the adjacent turns of the coil is prepared, it is possible to prevent a foreign substance (for example, sintered metal particles or metal chips of the core) from being caught in a gap between the adjacent turns. In addition, it is also possible to prevent the forming mold from coming into contact with the surface of the coil when the coil assembly is disposed in the forming mold or when the mold is closed. As a result, since the coil is less likely to be damaged, it is possible to prevent peeling off of the insulation coat with which the outer peripheral surface of the winding is covered.

A gist of an invention according to a solution 6 is that in the solution 5, after the coil covering preparing operation and before the coil assembly preparing operation, a resin portion molding operation of molding a resin portion configuring a part of the resin mold portion is performed by performing the injection molding after setting the coil covering in the forming mold.

Therefore, according to the invention according to the solution 6, when the coil is disposed in the forming mold or when the mold is closed, since the coil covering is formed by covering the coil with the protective membrane, it is possible to prevent the forming mold from directly coming into contact with the surface of the coil. As a result, since the coil is less likely to be damaged, it is possible to prevent peeling off of the insulation coat with which the outer peripheral surface of the winding is covered not only during the resin mold portion molding operation but also during the resin portion molding operation.

A gist of an invention according to a solution 7 is that in the solution 5 or 6, the coil covering preparing operation includes covering the at least one part of the surface of the coil with a film that is the protective membrane.

Therefore, according to the invention according to the solution 7, by covering the surface of the coil with the film, the gap between the adjacent turns of the coil can be closed with the film, and thus it is possible to prevent a foreign substance from entering the gap.

A gist of an invention according to a solution 8 is that in the solution 7, the coil covering preparing operation includes covering at least one portion against which the forming mold abuts with the film on the surface of the coil.

Therefore, according to the invention according to the solution 8, since the portion of the surface of the coil that is likely to be damaged due to abutment by the forming mold is covered with the film, the coil is less likely to be damaged.

A gist of an invention according to a solution 9 is that in any one of solutions 5 to 8, the method further includes a peeling operation of peeling off at least one part of the protective membrane corresponding to a portion which is not covered with the resin mold portion in the coil covering, after the resin mold portion molding operation.

Therefore, according to the invention according to the solution 9, since heat of the coil is released from a portion which is not covered with the protective membrane after the peeling operation, it is possible to secure a predetermined heat dissipation property.

A gist of an invention according to a solution 10 is that in the solution 9, the protective membrane is a film to which a perforation is formed, and the peeling operation includes cutting the protective membrane along the perforation.

Therefore, according to the invention according to the solution 10, the protective membrane can be easily peeled off.

Advantageous Effects of Invention

As described in detail above, according to the inventions according to aspects 1 to 10, it is possible to prevent peeling off of the insulation coat with which the outer peripheral surface of the winding is covered.

BEST MODE FOR CARRYING OUT INVENTION

Hereinafter, an embodiment embodying the present invention will be described in detail with reference to the drawings.

Figure 1:
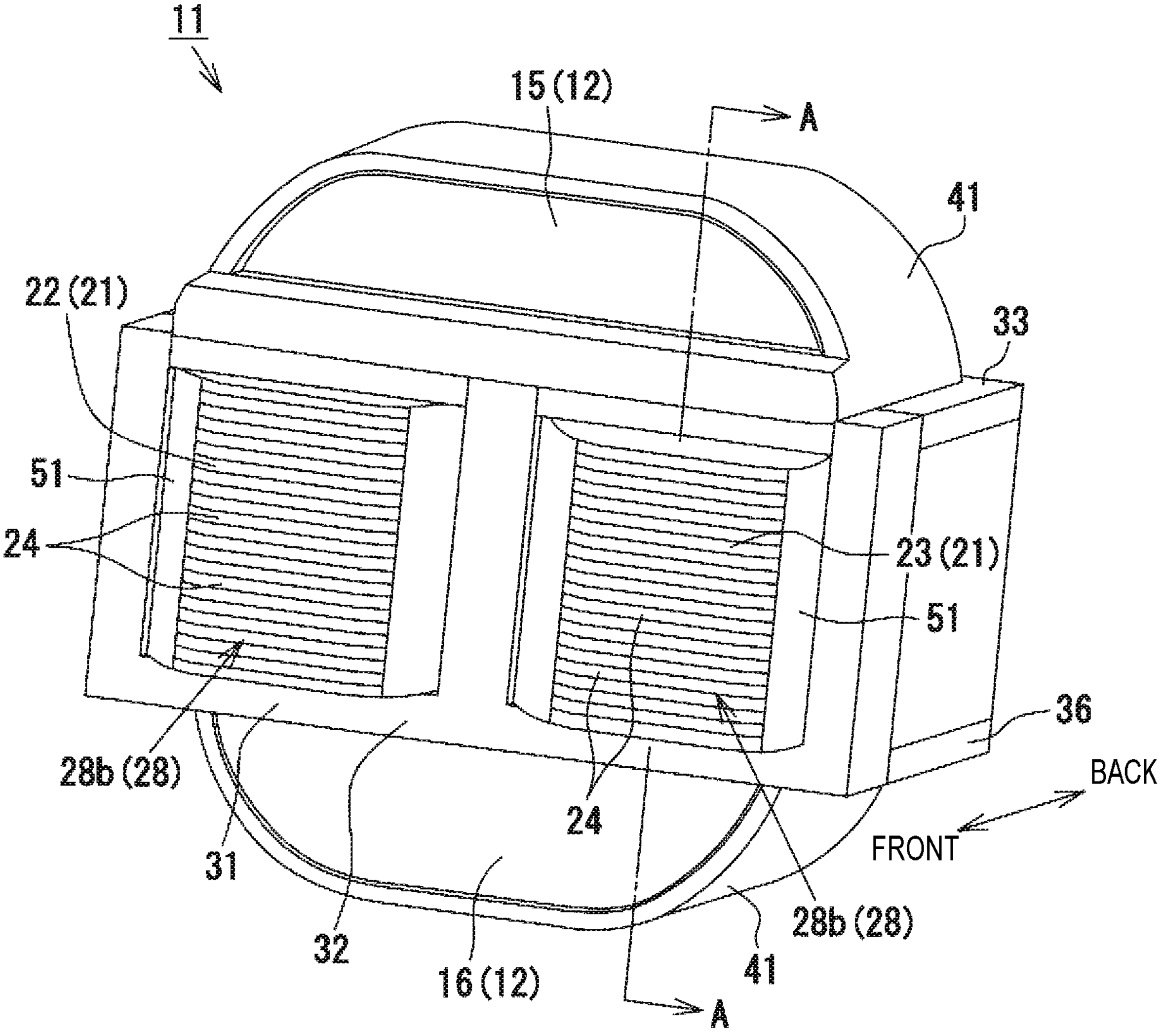
FIG. 1 is a schematic perspective view showing a reactor according to the present embodiment.
Figure 5:
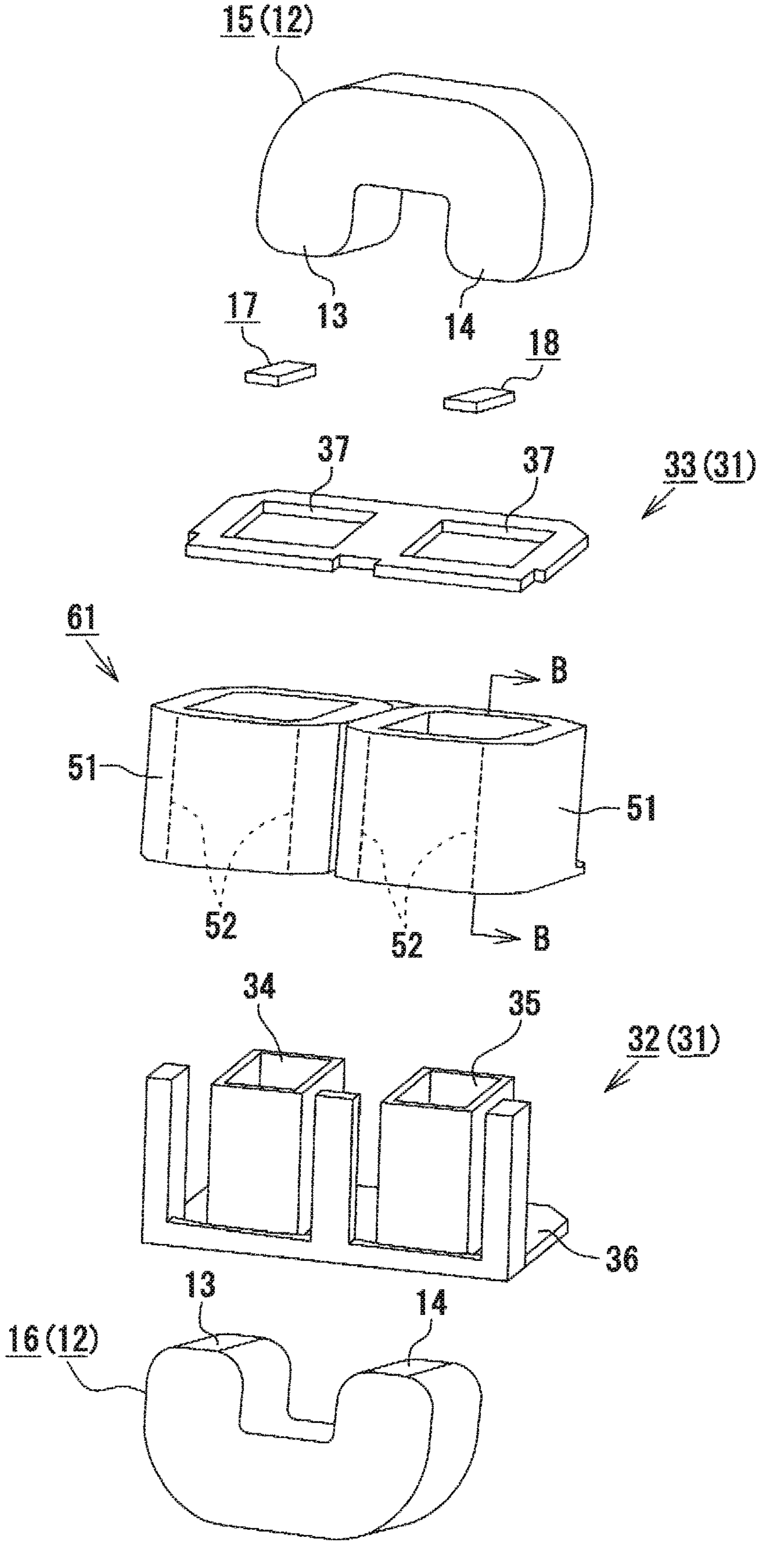
FIG. 5 is an exploded perspective view showing core portions, spacers, a coil covering and a bobbin.

As shown in FIG. 1, a reactor 11 according to the present embodiment includes a core 12 and a coil 21 disposed on an outer periphery of the core 12. Further, as shown in FIG. 5, the core 12 includes a pair of U-shaped core portions 15 and 16 each having a first end portion 13 and a second end portion 14. Two core portions 15 and 16 are arranged in a state in which the first end portions 13 face each other with a rectangular plate-shaped first spacer 17 interposed therebetween, and the second end portions 14 face each other with a rectangular plate-shaped second spacer 18 interposed therebetween. It should be noted that the core portions 15 and 16 are made of a soft magnetic material. As the soft magnetic material, a soft magnetic powder made of iron or an iron alloy (Fe—Si alloy, Fe—Ni alloy, etc.), a soft magnetic powder coated with insulation, a composite material of a soft magnetic powder and a resin, and the like can be used. In addition, the spacers 17 and 18 are formed of a material (for example, a non-magnetic material such as alumina) having a relative magnetic permeability lower than that of the core portions 15 and 16.

Figure 2:
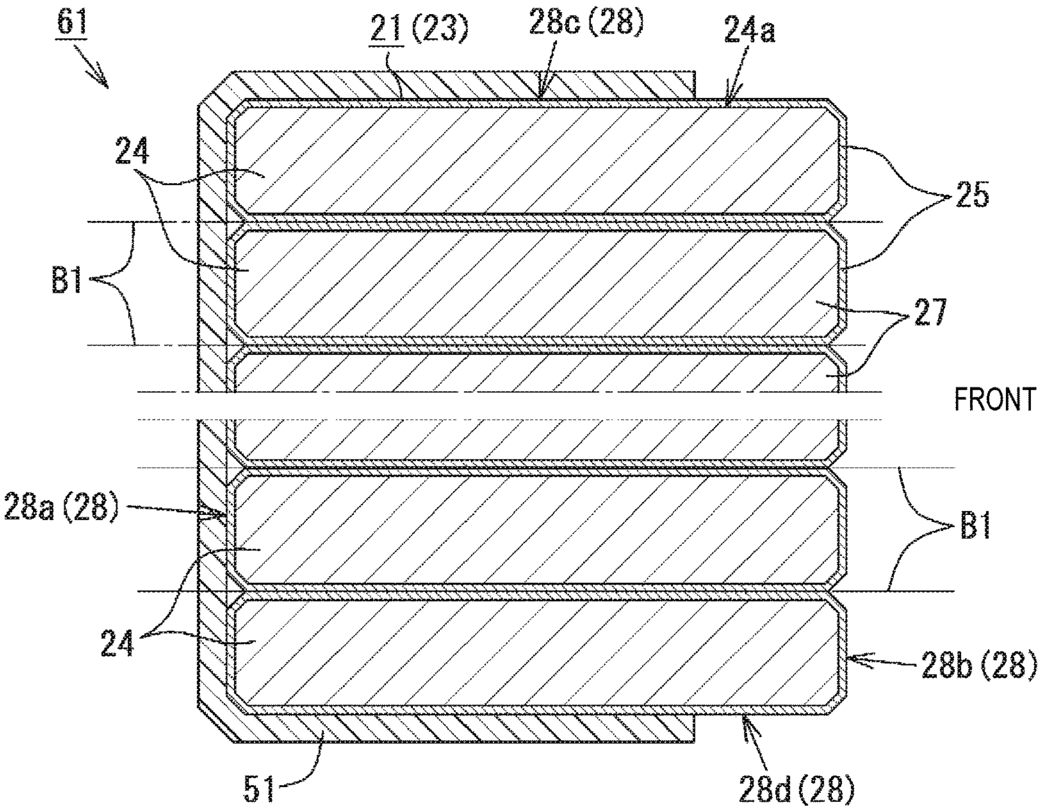
FIG. 2 is a cross-sectional view taken along a line A-A in FIG. 1.
Figure 3:
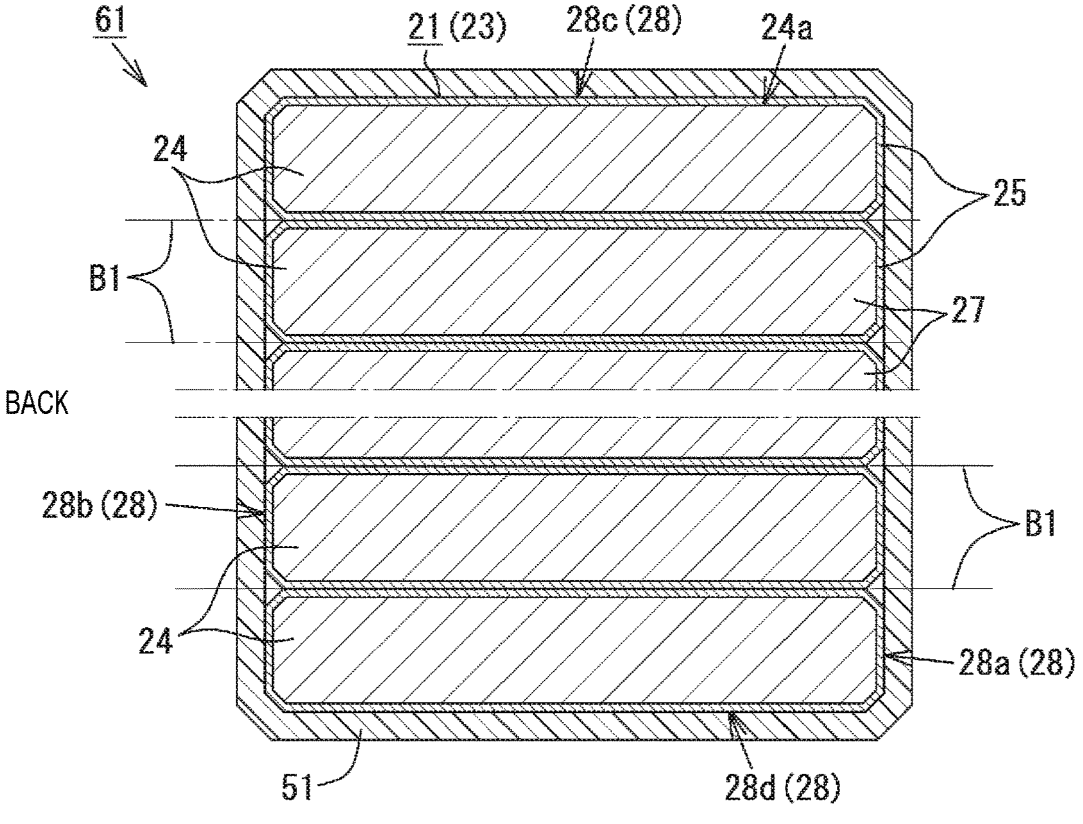
FIG. 3 is a cross-sectional view taken along a line B-B in FIG. 5.

As shown in FIGS. 1 to 5, the coil 21 includes a first winding portion 22 disposed on an outer periphery of the first end portion 13 of each the core portions 15 and 16, and a second winding portion 23 disposed on an outer periphery of the second end portion 14 of each of the core portions 15 and 16. The winding portions 22 and 23 according to the present embodiment are substantially rectangular cylindrical edgewise coils formed by spirally winding a winding 24 having a substantially rectangular cross section. In addition, as shown in FIGS. 2 and 3, the winding 24 according to the present embodiment is an enamel wire having an outer peripheral surface 24*a* covered with an enamel coat 25 (insulation coat) having a thickness of 10 μm. It should be noted that each of the two winding portions 22 and 23 is formed of a continuous winding 24. In addition, as shown in FIGS. 4A and 4B, the winding 24 forming the first winding portion 22 and the winding 24 forming the second winding portion 23 are connected to each other via a connecting portion 26.

Figure 6:
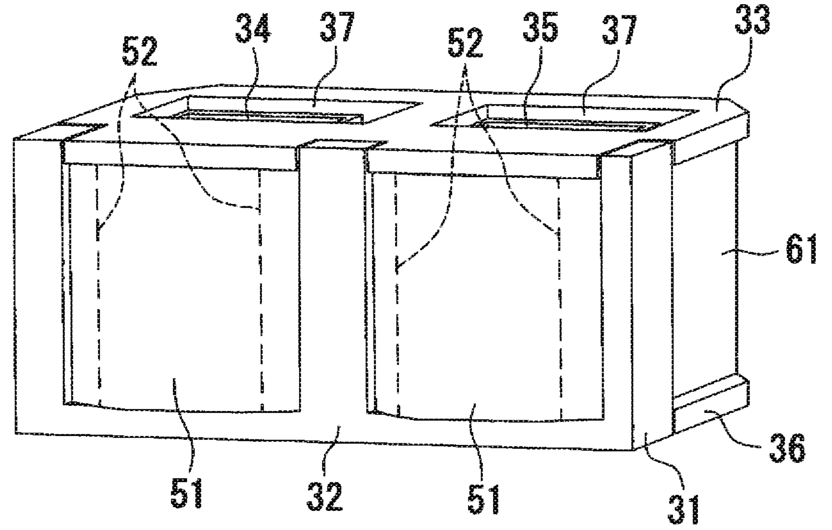
FIG. 6 is a view showing a coil assembly preparing operation.

As shown in FIG. 1, the reactor 11 includes a bobbin 31 made of a resin material interposed between the core 12 and the coil 21. The bobbin 31 has a function of positioning the core 12 and the coil 21 and a function of insulating the core 12 and the coil 21. In addition, as shown in FIGS. 5 and 6, the bobbin 31 includes a bobbin body 32 and a flange member 33. The bobbin body 32 has a structure in which a pair of cylindrical portions 34 and 35 are connected by a flange 36. The first end portions 13 of the core portions 15 and 16 are inserted into the first cylindrical portion 34, and the second end portions 14 of the core portions 15 and 16 are inserted into the second cylindrical portion 35. In addition, a pair of insertion holes 37 for inserting the first end portion 13 and the second end portion 14 are provided in the flange member 33.

As shown in FIG. 1, the reactor 11 includes a resin mold portion 41 integrating the core 12 and the coil 21 while partially covering the core 12 and the coil 21. The resin mold portion 41 is, for example, an injection-molded article formed using a thermoplastic resin (resin material) such as a PBT resin (polybutylene terephthalate resin) or a PPS resin (polyphenylene sulfide resin). It should be noted that a thickness of the resin mold portion 41 is, for example, about 2 mm.

In addition, as shown in FIGS. 2 and 3, in the present embodiment, most of a surface 28 of the coil 21 is covered with a film 51 (protective membrane) so as to cover a boundary B1 between adjacent turns 27 of the coil 21. Accordingly, the coil 21 becomes a reactor coil covering 61 (hereinafter referred to as "coil covering 61"). In addition, a part of a region on the surface 28 of the coil 21 which is not covered with the bobbin 31 or the resin mold portion 41 is not covered with the film 51 and serves as a heat dissipation surface (see FIG. 1). More specifically, the film 51 covers an entire inner surface 28*a*, most of an upper surface 28*c*, and most of a lower surface 28*d* of the coil 21 at a part on a front side of the coil 21 (see FIG. 2). However, an entire outer surface 28*b*, a part of the upper surface 28*c*, and a part of the lower surface 28*d* of the coil 21 are not covered with the film 51 and serve as heat dissipation surfaces. Meanwhile, the film 51 covers the entire inner surface 28*a*, the entire outer surface 28*b*, the entire upper surface 28*c*, and the entire lower surface 28*d* of the coil 21 at a part on a back side of the coil 21 (see FIG. 3). Accordingly, a tension of the film 51 is applied to the coil 21 in a direction to bring the adjacent turns 27 into close contact with each other.

In addition, the film 51 is in close contact with the surface 28 of the coil 21. Specifically, the film 51 covering the upper surface 28*c* and the lower surface 28*d* of the coil 21 is completely in close contact with the upper surface 28*c* and the lower surface 28*d*. Meanwhile, the film 51 covering the inner surface 28*a* and the outer surface 28*b* of the coil 21 is almost entirely in close contact with the inner surface 28*a* and the outer surface 28*b*. However, the film 51 is not in close contact with a region near the boundary B1 between the inner surfaces 28*a* and the boundary B1 between the outer surfaces 28*b*, respectively. In the proximity of each boundary B1, a gap is formed. It should be noted that the film 51 may also be in close contact with the region near the boundary B1. The film 51 according to the present embodiment is, for example, a gray film formed of a heat-resistant resin material such as a PET resin (polyethylene terephthalate resin) or a PI resin (polyimide resin). In addition, a thickness of the film 51 is 500 μm or more, and is larger than a thickness (10 μm) of the enamel coat 25 of the winding 24.

Next, a forming mold 71 for manufacturing the reactor 11 will be described.

Figure 8:
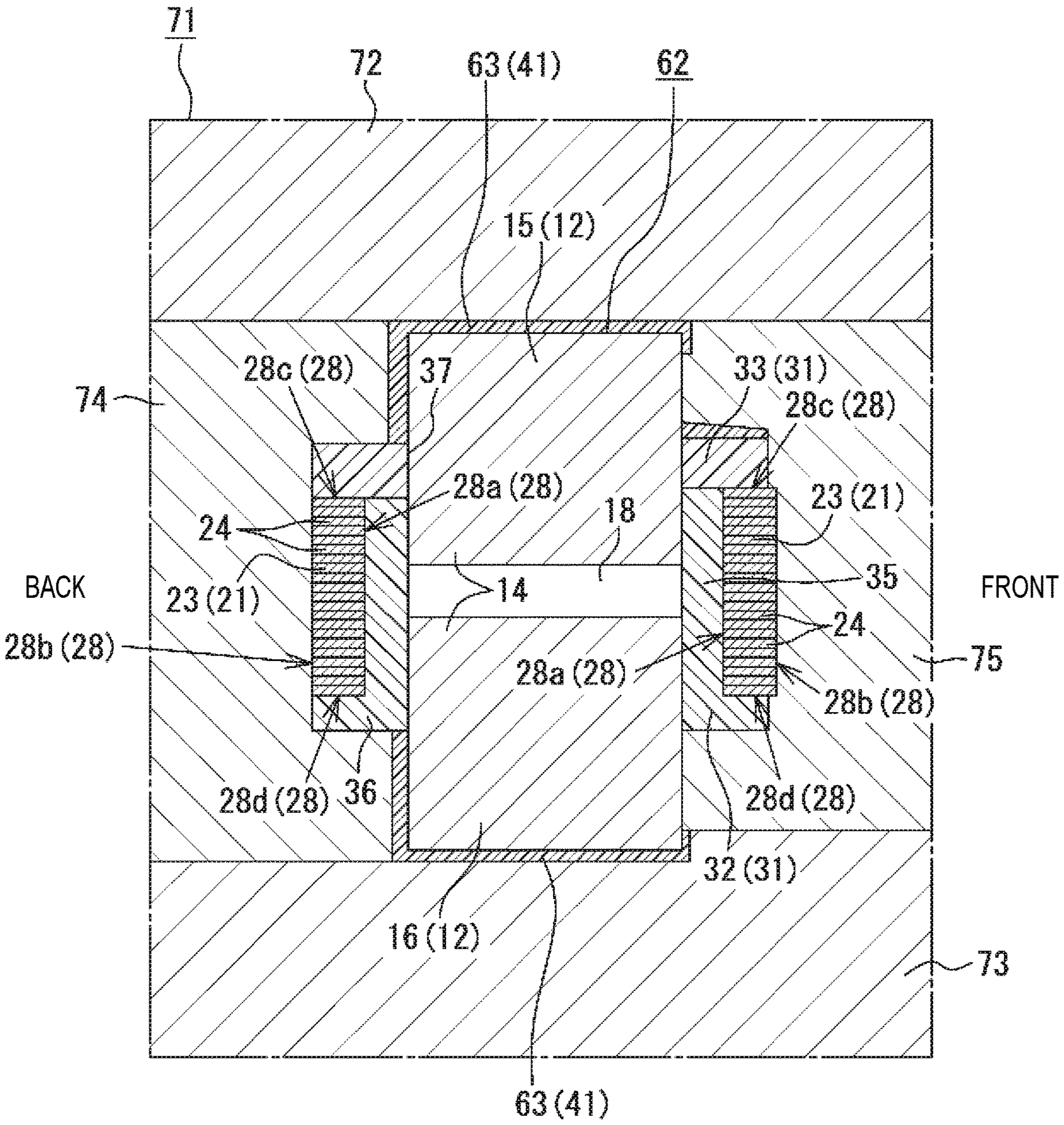
FIG. 8 is a schematic cross-sectional view showing a resin mold portion molding operation (corresponding to a cross-sectional view taken along a line C-C in FIG. 7).

As shown in FIG. 8, the forming mold 71 includes an upper mold 72, a lower mold 73 and slide molds 74 and 75. In the present embodiment, the upper mold 72 and the lower mold 73 can be moved close to and away from each other by driving the upper mold 72 in an up-and-down direction. In addition, the slide molds 74 and 75 can be moved close to and away from each other by driving the slide molds 74 and 75 in a left-right direction. Then, when the forming mold 71 is closed, a cavity, which is a molding space, is formed in the forming mold 71.

Next, a method for manufacturing the reactor 11 will be described.

Figure 4A:
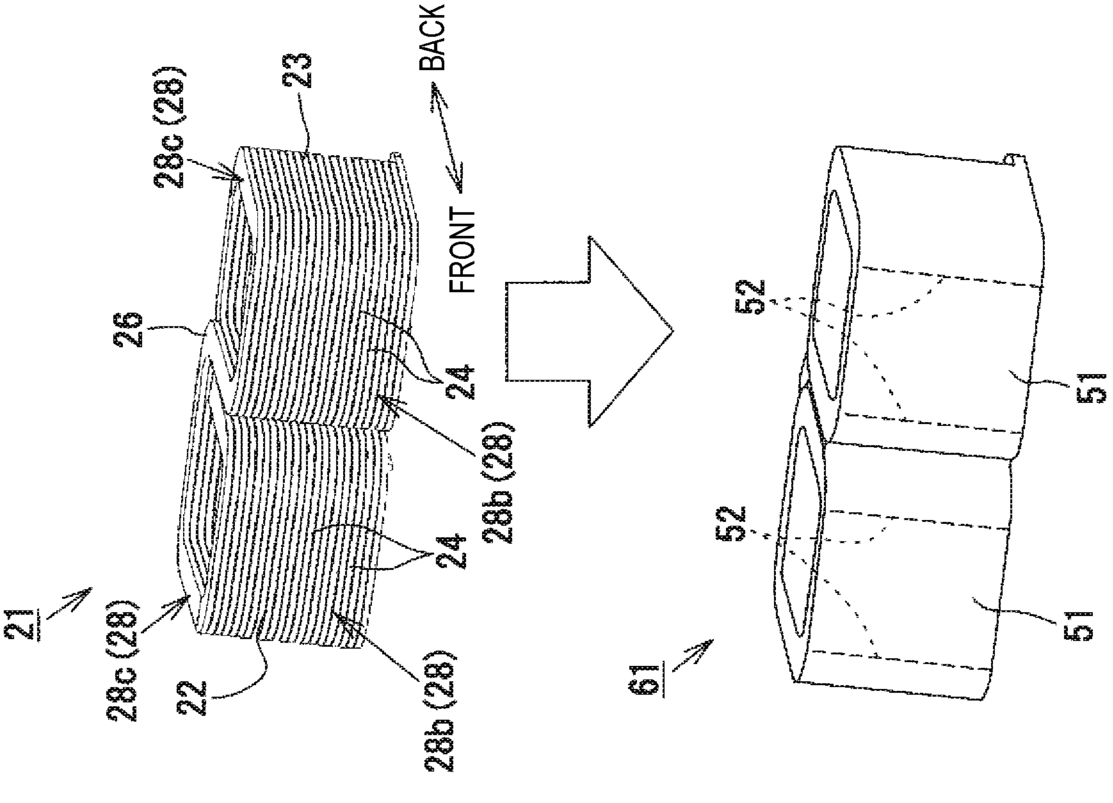
FIG. 4A is a view illustrating a coil covering preparing operation showing a state of a coil and a coil covering viewed from a front side.
Figure 4B:
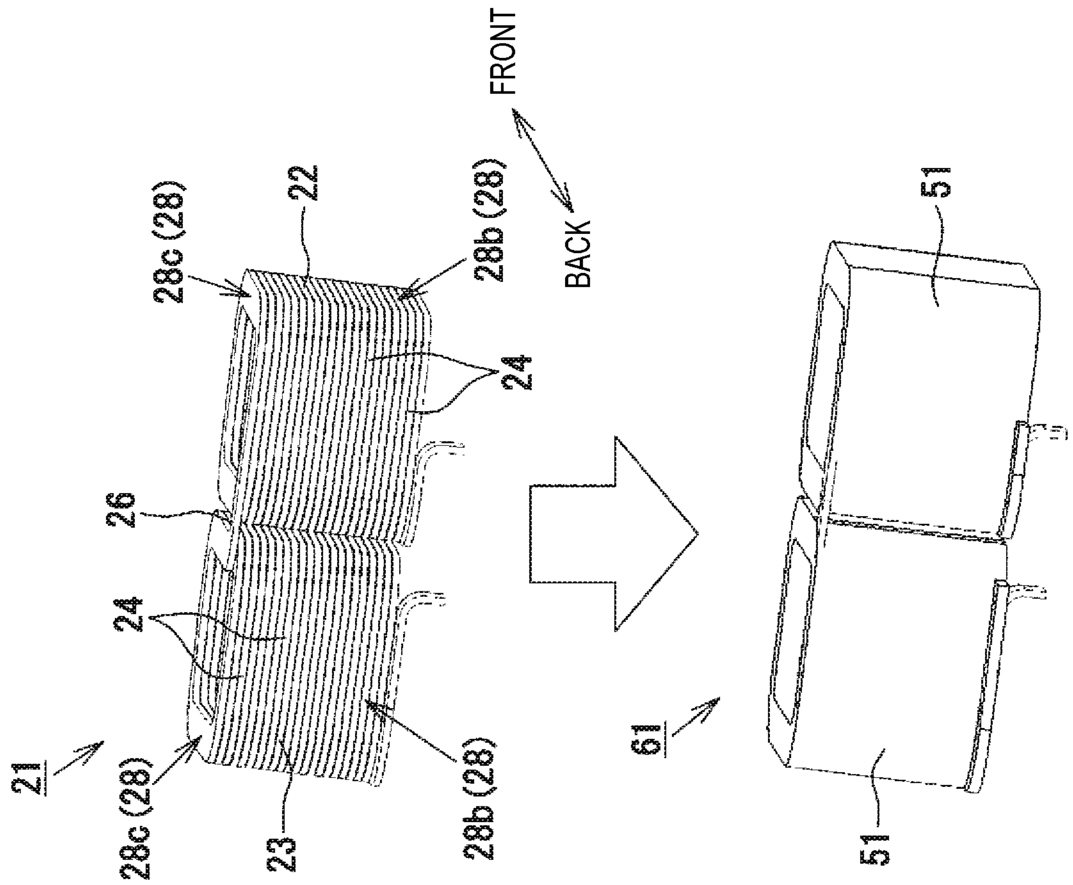
FIG. 4B is a view illustrating the coil covering preparing operation showing a state of the coil and the coil covering viewed from a back side.

First, a coil covering preparing operation is performed to prepare the coil covering 61 formed by covering the surface 28 of the coil 21 with the film 51 (see FIGS. 4 and 5). Specifically, the coil covering 61 is formed by covering the entire surface 28 of the coil 21 with the film 51 in a state in which the adjacent turns 27 of the coil 21 are in close contact with each other. In the present embodiment, in addition to the entire outer surface 28*b* of the coil 21, which is a portion of the surface 28 of the coil 21 that the slide molds 74 and 75 abut against, the entire inner surface 28*a*, the entire upper surface 28*c*, and the entire lower surface 28*d* of the coil 21 are also covered with the film 51. It should be noted that four perforations 52 are formed in the film 51. Each perforation 52 is formed by cutting in the film 51 with a jig or the like. More specifically, in the present embodiment, two perforations 52 are formed in each of the film 51 covering the first winding portion 22 and the film 51 covering the second winding portion 23. Each perforation 52 is placed on the front side of the coil 21 (see FIG. 4A) and extends along a height direction of the coil 21 (axial direction of the winding portions 22 and 23).

Figure 7:
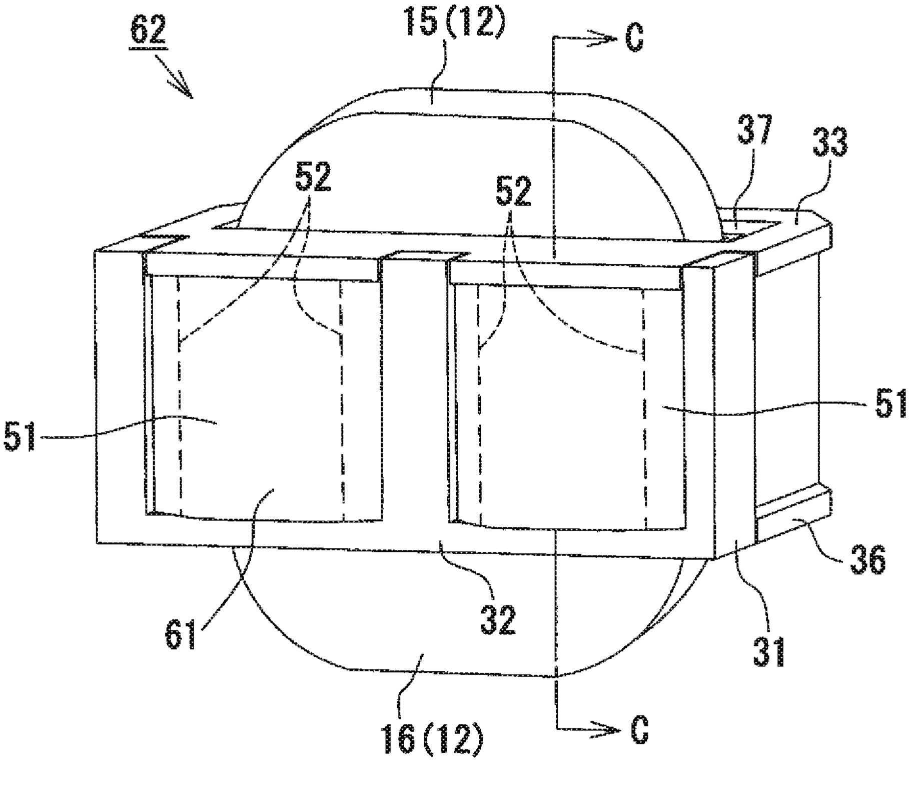
FIG. 7 is a schematic perspective view showing a coil assembly.

In a subsequent coil assembly preparing operation, a coil assembly 62 (see FIG. 7) formed by assembling the core 12 and the coil covering 61 is prepared. Specifically, first, the first cylindrical portion 34 of the bobbin body 32 is inserted through the first winding portion 22, and the second cylindrical portion 35 of the bobbin body 32 is inserted through the second winding portion 23. Next, the flange member 33 is attached to the bobbin body 32 (see FIG. 6). Then, an adhesive is applied to tip surfaces of the end portions 13 and 14 of the core portion 15, and the first spacer 17 is adhered to the tip surface of the first end portion 13 and the second spacer 18 is adhered to the tip surface of the second end portion 14. In addition, the adhesive is also applied to tip surfaces of the end portions 13 and 14 of the core portion 16. Then, the first end portions 13 of the core portions 15 and 16 are inserted into the first cylindrical portion 34 (first winding portion 22), and the second end portions 14 of the core portions 15 and 16 are inserted into the second cylindrical portion 35 (second winding portion 23). As a result, the core portion 15 and the core portion 16 are adhered to each other via the spacers 17 and 18, and the coil assembly 62 is completed.

In a subsequent resin mold portion molding operation, the coil assembly 62 is set in the cavity of the forming mold 71 and then injection molding is performed to mold the resin mold portion 41 (see FIG. 8). Specifically, first, the coil assembly 62 is placed on the lower mold 73 with the upper mold 72, the lower mold 73 and the slide molds 74 and 75 forming the forming mold 71 opened. Then, the upper mold 72, the lower mold 73 and the slide molds 74 and 75 are closed by driving the slide molds 74 and 75 in a direction to approach each other while driving the upper mold 72 downward. As a result, a cavity, which is a portion filled with a resin material, is formed inside each of the upper mold 72, the lower mold 73 and the slide molds 74 and 75. In addition, at this point, the slide mold 74 abuts against the outer surface 28*b* of a back side portion of the coil 21, and the slide mold 75 abuts against the outer surface 28*b* of a front side portion of the coil 21.

Next, the cavity is filled with a molten resin material 63 and the molten resin material 63 is injection molded. Specifically, the resin material 63 is injected into the cavity from a resin injection port (not shown) of the forming mold 71. Then, the resin mold portion 41 joined to surfaces of the core portions 15 and 16 and a surface of the bobbin 31 is molded by cooling and solidifying the molten resin material 63. As a result, the core 12, the coil 21 and the bobbin 31 are partially covered with the resin mold portion 41 and are integrated via the resin mold portion 41.

Figure 9:
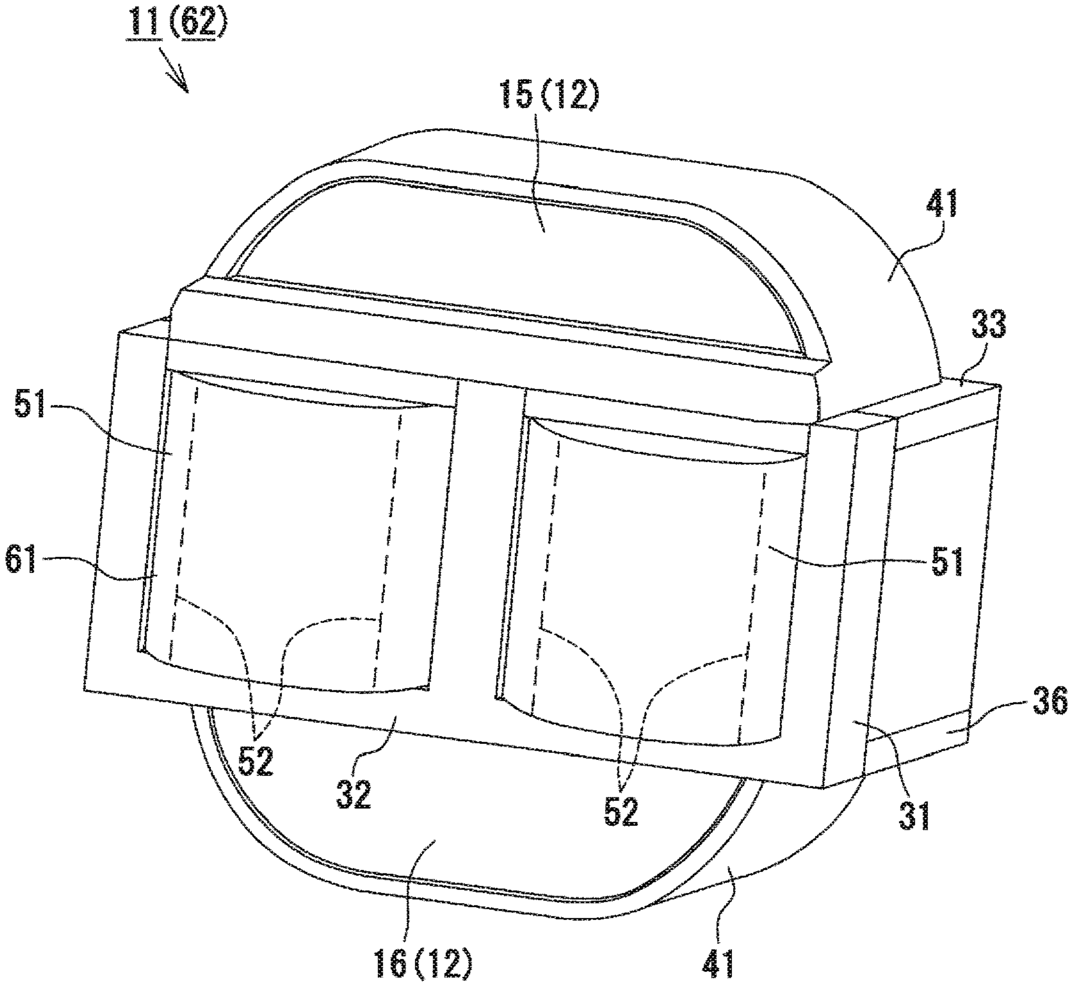
FIG. 9 is a schematic perspective view showing a coil assembly in which a resin mold portion is molded.
Figure 10:
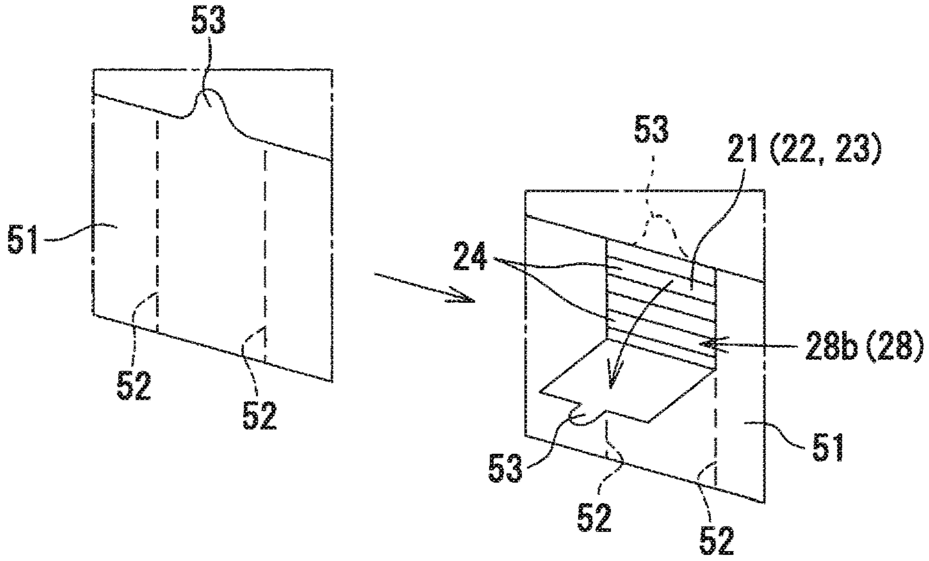
FIG. 10 is a view showing a peeling operation.

After the resin mold portion molding operation, the upper mold 72, the lower mold 73 and the slide molds 74 and 75 are opened, and the coil assembly 62 covered with the resin mold portion 41 is taken out (see FIG. 9). Further, a peeling operation is performed to peel off a part of the film 51 on a portion of the coil covering 61 which is not covered with the resin mold portion 41 (see FIG. 10). Specifically, an operator raises a tab 53 of the film 51 that is in close contact with the upper surface 28*c* of the coil 21, pinches the raised tab 53, and pulls the raised tab 53 to a lower side of the coil 21, thereby cutting the film 51 along the perforations 52. In the present embodiment, the film 51 on the front side (front surface side in FIG. 9) of the coil 21, which is a heat dissipation portion, is peeled off along the perforations 52. It should be noted that since a region on the back side of the coil 21 which is not covered with the bobbin 31 or the resin mold portion 41 is not a main heat dissipation portion, the film 51 may not be peeled off.

Therefore, according to the present embodiment, the following effects can be achieved.

(1) In the reactor 11 according to the present embodiment, since most of the surface 28 of the coil 21 is covered with the film 51 so as to cover the boundary B1 between adjacent turns 27 of the coil 21, it is possible to prevent a foreign substance (for example, sintered metal particles or metal chips of the core 12) from being caught in a gap between the adjacent turns 27. As a result, since the coil 21 is less likely to be damaged, it is possible to prevent peeling off of the enamel coat 25 with which the outer peripheral surface 24*a* of the winding 24 is covered. Therefore, it is possible to prevent a short circuit between windings 24 due to peeling off of the enamel coat 25.

(2) In the resin mold portion molding operation according to the present embodiment, when the coil assembly 62 is set in the cavity of the forming mold 71, the forming mold 71 may come into contact with the outer surface 28*b* of the coil 21. In addition, when the forming mold 71 is closed, the forming mold 71 comes into contact with the outer surface 28*b* of the coil 21. However, in the present embodiment, when the resin mold portion molding operation is performed, the entire surface 28 of the coil 21 is covered with the film 51, and therefore, even if the forming mold 71 comes into contact with the surface 28, it is possible to prevent the enamel coat 25 with which the outer peripheral surface 24*a* of the winding 24 is covered from being damaged.

(3) In the present embodiment, particularly on the back side portion of the coil 21 (see FIG. 3), the entire inner surface 28*a*, the entire outer surface 28*b*, the entire upper surface 28*c*, and the entire lower surface 28*d* of the coil 21 are covered with the film 51. Accordingly, since the coil 21 is fixed while being wrapped in the film 51, it is possible to prevent widening of the gap between the adjacent turns 27 of the coil 21.

(4) In the peeling operation according to the present embodiment, a part of the film 51 on a portion of the coil covering 61 which is not covered with the resin mold portion 41 is peeled off. As a result, after the peeling operation, heat of the coil 21 is released from a portion which is not covered with the film 51 (for example, the outer surface 28*b* of the coil 21), and therefore, it is possible to secure a predetermined heat dissipation property. Moreover, it is possible to prevent a foreign substance from entering the gap between the adjacent turns 27 of the coil 21 by the remaining film 51.

It should be noted that the above-mentioned embodiment may be modified as follows.

Although the protective membrane according to the above-mentioned embodiment is the gray film 51, the protective membrane may be a film of other colors such as white or black, or may be a transparent film. It should be noted that when the film is transparent, a state of the coil 21 covered with the film can be checked. In addition, a marking may be attached to the film. In this way, even if the film is transparent, the operator can check presence or absence of the film by checking presence or absence of the marking. Examples of the marking include characters (for example, those representing a product number, a lot, a type, etc.), symbols, figures, and the like drawn on a surface of the film. In addition, the marking may be attached to a portion of the film that is to be peeled off in the peeling operation, or may be attached to a portion of the film that remains after the peeling operation.

In the coil covering preparing operation according to the above-mentioned embodiment, although the entire surface 28 of the coil 21 is covered with the film 51, which is a protective membrane, the surface 28 of the coil 21 may be covered with a protective membrane using other methods. For example, a protective membrane may be formed by spraying, applying and curing a polyamide-imide adhesive onto at least a part of the surface 28 of the coil 21. In this way, the protective membrane can be easily formed. It should be noted that when the protective membrane is the film 51, a tension of the film 51 can be applied in a direction to bring the adjacent turns 27 of the coil 21 into close contact with each other.

In the above-mentioned embodiment, a part (most) of the surface 28 of the coil 21 is covered with the film 51. However, all the film 51 on a portion of the coil covering 61 which is not covered with the bobbin 31 or the resin mold portion 41 may be peeled off. Meanwhile, if heat can be released from the surface 28 of the coil 21 through the film 51 due to a good thermal conductivity of the film 51, the entire surface 28 of the coil 21 can be covered with the film 51 without peeling off the film 51.

In the above-mentioned embodiment, in the resin mold portion molding operation after the coil assembly preparing operation, the coil assembly 62 is set in the forming mold 71 and then injection molding is performed to mold the resin mold portion 41. However, the resin portion molding operation may be performed in advance after the coil covering preparing operation and before the coil assembly preparing operation to mold a resin portion forming a part of the resin mold portion 41.

For example, the coil covering 61 may be set in a forming mold different from the forming mold 71 according to the above-mentioned embodiment and then injection molding may be performed to mold a bobbin similar to the bobbin 31 according to the above-mentioned embodiment as the resin portion. Then, in the coil assembly preparing operation, the coil assembly 62 may be formed by inserting the end portions 13 and 14 of the core portions 15 and 16 into the cylindrical portions of the bobbin formed on the coil covering 61.

In addition, the core 12 may be set in a forming mold different from the forming mold 71 according to the above-mentioned embodiment and then injection molding may be performed to mold a bobbin similar to the bobbin 31 according to the above-mentioned embodiment as the resin portion. For example, the core portion 15 forming the core 12 may be set in a first forming mold and then injection molding may be performed to mold a flange member similar to the flange member 33 according to the above-mentioned embodiment as the resin portion. In addition, the core portion 16 forming the core 12 may be set in a second forming mold and then injection molding may be performed to mold a bobbin body similar to the bobbin body 32 according to the above-mentioned embodiment as the resin portion. Then, in the coil assembly preparing operation, the cylindrical portions of the bobbin body molded on the core portion 16 may be inserted through the winding portions 22 and 23 of the coil 21 and then the flange member molded on the core portion 15 is connected to the bobbin body to form the coil assembly 62.

In the above-mentioned embodiment, the winding portions 22 and 23 of the coil 21 are formed by winding the winding 24 having a substantially rectangular cross section. However, the winding 24 forming the winding portions 22 and 23 may have other shapes such as a circular cross section, an elliptical cross section, or a hexagonal cross section.

The coil 21 according to the above-mentioned embodiment includes the first winding portion 22 and the second winding portion 23. However, the coil may include only one winding portion, and the coil may include three or more winding portions.

Next, in addition to technical ideas recited in the claims, technical ideas understood from the above-described embodiments are listed below.

(1) The reactor according to any one of aspects 1 to 3, in which the protective membrane is a heat-resistant film. Such a configuration can withstand heat during injection molding.

(2) The reactor according to any one of aspects 1 to 3, in which the protective membrane is a film, and an inner surface and an outer surface of the coil are covered with the film. With such a configuration, since the coil can be wrapped and fixed by the film, it is possible to prevent widening of a gap between the adjacent turns of the coil.

(3) The reactor according to aspect 2, in which a thickness of the film is larger than a thickness of the insulation coat.

(4) The reactor according to aspect 2, in which the film is in close contact with the surface of the coil.

(5) The reactor according to any one of aspects 1 to 3, in which the protective membrane is a transparent film. With such a configuration, a state of the coil covered with the film can be checked.

(6) The reactor according to the technical idea (5), in which a marking is attached to the film. With such a configuration, even if the film is transparent, an operator can check presence or absence of the film by checking presence or absence of the marking.

(7) The method for manufacturing a reactor according to aspect 5, in which after the coil covering preparing operation and before the coil assembly preparing operation, a resin portion molding operation of setting the core in a forming mold and then performing injection molding to mold a resin portion forming a part of the resin mold portion is performed.

(8) The method for manufacturing a reactor according to aspect 7 or 8, in which in the coil covering preparing operation, the entire surface of the coil is covered with the film in a state in which the adjacent turns of the coil are in close contact with each other.

(9) The method for manufacturing a reactor according to any one of aspects 5 to 10, in which in the coil covering preparing operation, the protective membrane is formed by spraying and curing a polyamide-imide adhesive onto at least a part of the surface of the coil. With such a configuration, the protective membrane can be easily formed.

(10) The method for manufacturing a reactor according to aspect 9 or 10, in which in the peeling operation, a part of the protective membrane on a portion of the coil covering which is not covered with the resin mold portion is peeled off. With such a configuration, by peeling off a part of the protective membrane, heat of the coil can be released from the portion which is not covered with the protective membrane, and by the remaining protective membrane, a foreign substance can be prevented from entering the gap between the adjacent turns of the coil.

REFERENCE SIGNS LIST

11 reactor
12 core
21 coil
24 winding
**24*a*** outer peripheral surface of winding
25 enamel coat as insulation coat
27 turn
28 surface of coil
41 resin mold portion
51 film as protective membrane
52 perforation
61 reactor coil covering (coil covering)
62 coil assembly
71 forming mold
B1 boundary

The invention claimed is:

1. A reactor comprising:

a core;

a coil disposed on an outer periphery of the core; and a resin mold portion partially covering and integrating the core and the coil, wherein a winding of the coil has an outer peripheral surface covered with an insulation coat, and at least one part of a surface of the coil is covered with a protective membrane to cover a boundary between adjacent turns of the coil, and the protective membrane has a plurality of perforations in order to later expose the coil between the perforations.

2. The reactor according to claim 1, wherein the protective membrane is a film.

3. The reactor according to claim 1, wherein at least one part of a region which is not covered with the resin mold portion on the surface of the coil is not covered with the protective membrane.

4. A reactor coil covering comprising:

a coil disposed on an outer periphery of a core, wherein a winding of the coil has an outer peripheral surface covered with an insulation coat, at least one part of a surface of the coil is covered with a protective membrane to cover a boundary between adjacent turns of the coil, and the protective membrane has a plurality of perforations in order to later expose the coil between the perforations.

5. A method for manufacturing a reactor, the reactor including a core, a coil disposed on an outer periphery of the core, and a resin mold portion partially covering and integrating the core and the coil, a winding of the coil having an outer peripheral surface covered with an insulation coat, the method comprising:

a coil covering preparing operation of providing a coil covering formed by covering at least one part of a surface of the coil with a protective membrane to cover a boundary between adjacent turns of the coil;

a coil assembly preparing operation of providing a coil assembly formed by assembling the core and the coil covering;

a resin mold portion molding operation of setting the coil assembly in a forming mold and then performing an injection molding to mold the resin mold portion; and a peeling operation of peeling off at least one part of the protective membrane corresponding to a portion which is not covered with the resin mold portion in the coil covering, after the resin mold portion molding operation.

6. The method for manufacturing a reactor according to claim 5, wherein after the coil covering preparing operation and before the coil assembly preparing operation, a resin portion molding operation of molding a resin portion configuring a part of the resin mold portion is performed by performing the injection molding after setting the coil covering in the forming mold.

7. The method for manufacturing a reactor according to claim 5, wherein the coil covering preparing operation includes covering the at least one part of the surface of the coil with a film that is the protective membrane.

8. The method for manufacturing a reactor according to claim 7, wherein the coil covering preparing operation includes covering at least one portion against which the forming mold abuts with the film on the surface of the coil.

9. The method for manufacturing a reactor according to claim 5, wherein the protective membrane is a film to which a perforation is formed, and the peeling operation includes cutting the protective membrane along the perforation.

* * * * *